(12) United States Patent
Yamashita et al.

(10) Patent No.: US 7,324,413 B2
(45) Date of Patent: Jan. 29, 2008

(54) OPTICAL DISC DEVICE

(75) Inventors: Tomonori Yamashita, Kato (JP); Toru Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 10/929,627

(22) Filed: Aug. 30, 2004

(65) Prior Publication Data

US 2005/0226107 A1    Oct. 13, 2005

(30) Foreign Application Priority Data

Mar. 30, 2004  (JP)  ............... 2004-100582

(51) Int. Cl.
  *G11G 7/00*  (2006.01)
(52) U.S. Cl. ............... 369/44.29; 369/44.32
(58) Field of Classification Search ............ 369/44.28, 369/44.29, 44.32
  See application file for complete search history.

(56) References Cited

U.S. PATENT DOCUMENTS

| | | | | |
|---|---|---|---|---|
| 5,623,464 A | * | 4/1997 | Tani | 369/44.28 |
| 5,870,356 A | * | 2/1999 | Ikeda | 369/44.28 |
| 5,933,397 A | * | 8/1999 | Yamashita et al. | 369/44.29 |
| 6,118,739 A | * | 9/2000 | Kishinami et al. | 369/44.32 |
| 6,249,496 B1 | * | 6/2001 | Tsukahara et al. | 369/44.29 |

FOREIGN PATENT DOCUMENTS

| | | |
|---|---|---|
| JP | 5-109101 | 4/1993 |
| JP | 5-144051 | 6/1993 |
| JP | 11-086309 | 3/1999 |
| JP | 2000-339729 | 12/2000 |

* cited by examiner

*Primary Examiner*—Thang V. Tran
(74) *Attorney, Agent, or Firm*—Greer, Burns & Crain, Ltd.

(57) ABSTRACT

An optical disc device of the present invention has a carriage opposed to an optical disc medium and capable of moving in a radial direction of the optical disc medium; a first driving section for driving the carriage; an object lens mounted in the carriage for focusing laser light on the optical disc medium; a second driving section mounted in the carriage for displacing the object lens in the radial direction of the object lens; a lens-position detecting section fixed to the carriage for detecting positional information on the object lens; an eccentricity removing section for generating a position detecting signal by removing an eccentric component of the optical disc medium from the positional information on the object lens; and a displacement detecting section for determining, using the position detecting signal, whether or not the carriage should be driven and for providing an instruction to begin driving the carriage, to the first driving section, based on a result of the determination.

4 Claims, 12 Drawing Sheets

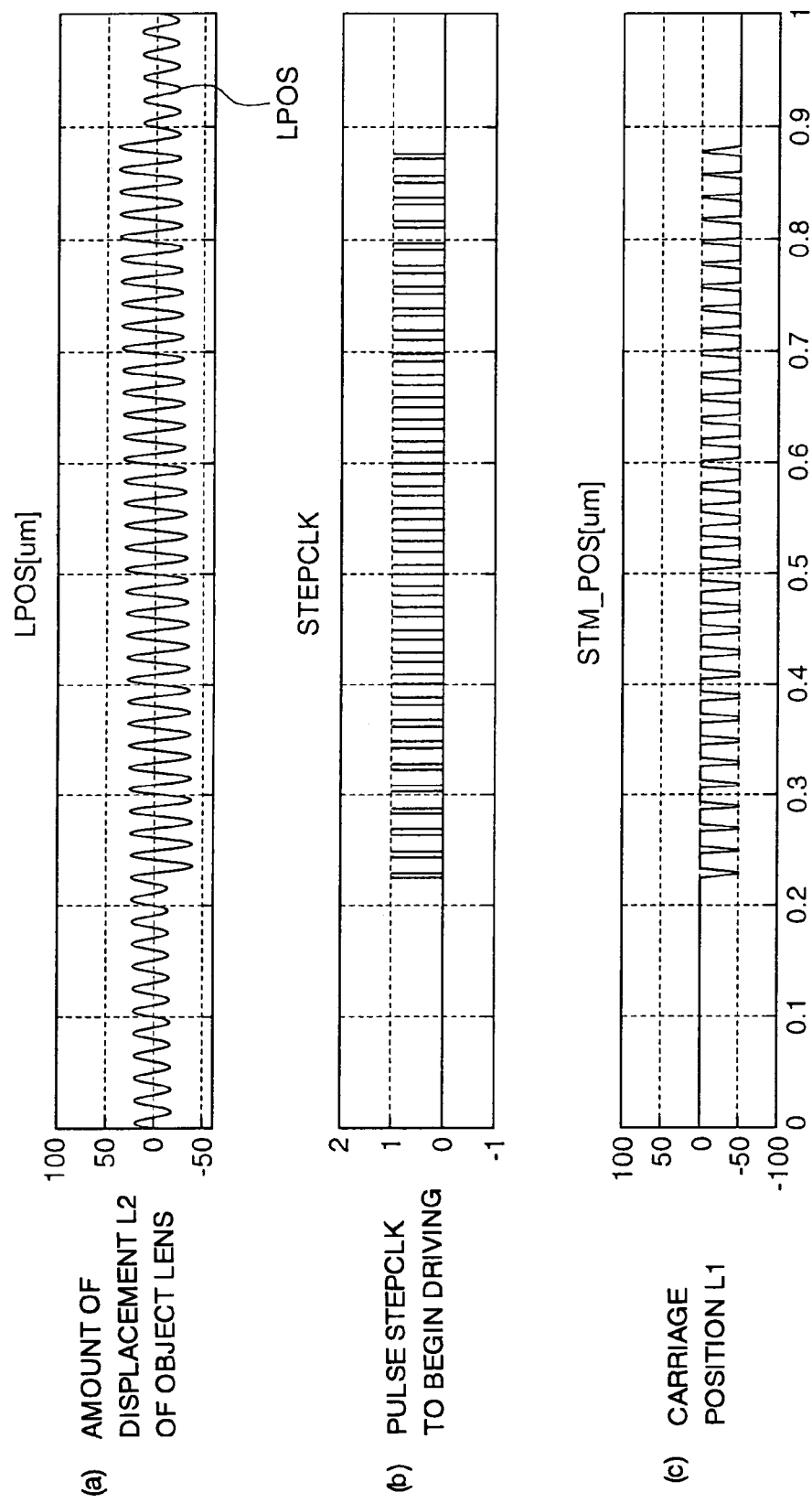

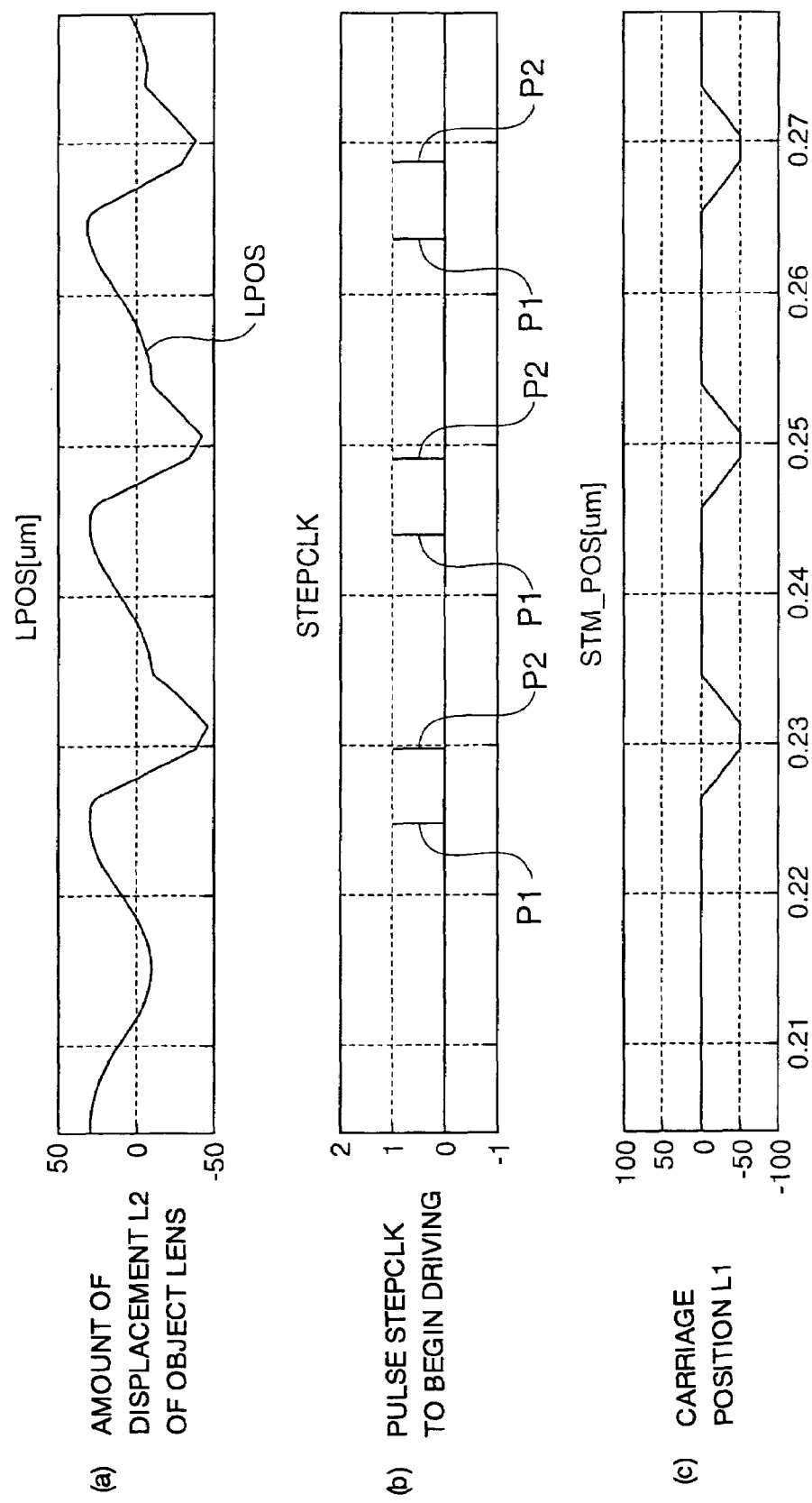

OPTICAL DISC DEVICE

CROSS-REFERENCE TO RELATED APPLICATION

This application is related to Japanese application No. 2004-100582 filed on Mar. 30, 2004, whose priority is claimed under 35 USC § 119, the disclosure of which is incorporated by reference in its entirety.

BACKGROUND OF THE INVENTION

1. Field of the Invention

The present invention relates to an optical disc device. More particularly, it relates to an optical disc device having the function of position control of a carriage and a lens actuator.

2. Description of Related Art

Optical disc devices are constructed to emit laser light from a semiconductor laser, to focus it through an object lens into a minute spotlight (hereafter, referred to as a light spot) and to apply the light spot onto a disc surface so that information can be written and read on the disc surface. For example, in the case of a magneto-optical disc, a spiral guide groove for guiding the light spot is formed in the disc surface so that information can be recorded on a convex portion (land) formed between the adjacent guides. The land corresponds to a track on which information is recorded. One round of the track is divided into a plurality of sectors (units for information recording).

In controlling an access of the light spot in recording and reproducing information to a track formed on the disc, first the light spot is moved to a designated track, then address information is read for each of the sectors of the designated track so as to designate a location at which the information is to be recorded or reproduced (sector location), and then the light spot is positioned at the designated location.

An operation that moves the light spot to a target track formed on a disc as described above is called a seek operation.

There have been proposed optical disc devices in which a constitutive block for generating the light spot is mounted in a carriage in order to reduce the size and profile of the optical disc devices. For example, optical elements such as a laser diode for emitting light beams, an object lens for focusing the light beams on the optical disc, a prism and the like; focus-error-signal detecting members for detecting a focus error signal (FES); tracking-error-signal detecting members for detecting a tracking error signal (TES); a lens actuator for slightly moving the object lens; and the like member are mounted in a carriage movable in a radial direction of the disc.

In such optical disc devices, seek control is performed in two stages by a rough seek operation and a precision seek operation. The rough seek operation is a seek operation that moves the entire carriage by a large distance in the radial direction of the disc to bring a light spot near to a target track. The precision seek operation is a seek operation that moves the object lens slightly in the radial direction of the disc by the lens actuator to set the light spot precisely to the target track.

The rough seek operation employs a stepping motor or a DC motor to move the carriage linearly via a lead screw or a gear. In many cases, in order to reduce the size and profile of optical disc devices, the rough seek operation employs a combination of a stepping motor and a gear.

By mounting the carriage over a linear screw-threaded transmission member (gear) and transmitting a rotational force of the stepping motor to the transmission member so as to rotate the transmission member, the carriage is moved linearly in the radial direction of the disc.

In general, upon receipt of a single pulse signal (drive pulse), a stepping-motor control section causes the stepping motor to be driven according to a predetermined pattern of excitation and thereby to be rotated by a given angle $\theta_0$, with the result that the carriage is moved linearly by a given distance $L_0$ responsive to the angle $\theta_0$. That is, the carriage is moved with the distance $L_0$ as a unit distance, and cannot be moved by a distance smaller than the distance $L_0$. Thus, the lens actuator is used for slightly moving the object lens in order to achieve accurate tracking.

The lens actuator includes a pair of electromagnets disposed in the vicinity of the object lens for controlling the position of the object lens by attraction forces of the electromagnets. The object lens is located at a "neutral position" serving as a so-called reference if current is not applied to the electromagnets, whereas it is displaced by the attraction forces of the electromagnets to a position slightly off the neutral position if current is applied. The object lens, which is urged by a spring, returns to the neutral position by a restoration force of the spring if the application of current is stopped.

In the case where eccentricity is absent in the optical disc, the light spot can be set to the target track with a high accuracy owing to the aforementioned two-stage seek control. Once being set to the target track, the light spot does not deviate from the target track.

However, in general, in the case where the eccentricity is present in the optical disc, the light spot deviates from the target track to the right or left during one turn of the optical disc, regardless of whether the optical disc has a spiral guide groove or coaxial tracks.

Against this, there is provided a circuit that, using light reflected from the optical disc, detects a signal responsive to an amount of deviation of the light spot from the target track (a tracking error signal (TES signal)). The circuit is called a tracking-error-signal detecting circuit. By displacing the position of the object lens in the carriage by the lens actuator based on the TES signal, the light spot is automatically adjusted to the target track on the optical disc so as to follow the eccentricity.

Many techniques have been proposed in which the eccentricity of the optical disc is detected and then a correction is made to compensate for the eccentricity for achieving an accurate seek control (for example, in Japanese Unexamined Patent Publication Nos. HEI 5(1993)-109101 and HEI 5(1993)-144051).

Also, optical disc devices have been proposed in which the eccentricity of the optical disc is learned in advance utilizing the tracking error signal (TES) and then, at the time of recording and reproduction on the optical discs, tracking control and the like are made using the eccentricity information obtained through the learning (for example, in Japanese Unexamined Patent Publication Nos. 2000-339729 and HEI 11(1999)-86309).

Meanwhile, in the case where the eccentricity is present in the optical disc, as described above, the position of the object lens is displaced slightly by the lens actuator. However, there is a limitation on the amount of displacement of the object lens. If the eccentricity exceeds a given maximum amount of displacement (hereafter, a slice), the object lens is displaced, and the carriage is also moved in a direction of displacement of the object lens by driving the stepping motor, since it is not preferable to make the light spot follow the eccentricity only by displacing the object lens by the actuator.

In the case where the eccentricity is present in the optical disc, the optical spot, if it once deviates off the track to the left, possibly deviates in the reverse direction to the right during one turn of the disc, making it necessary to move (return) the carriage in the reverse direction. Thus, there may be a return deviation opposite in direction to the initial deviation depending on the amount of the eccentricity, possibly making it necessary to drive the stepping motor not only once but twice during one turn of the disc.

While such driving of the stepping motor to reciprocate the carriage is an operation needed for accurate tracking, it increases power consumption since it is made inevitably every turn of the disc.

Further, since such driving of the stepping motor is made for a short period of several microseconds, it provides vibrations to the lens actuator, and affects tracking performance.

In the case where the object lens is urged by the spring, during driving of the lens actuator, the returning reaction of the spring generates disturbance in tracking, and possibly decreases the stability in tracking servo.

SUMMERY OF THE INVENTION

The present invention has been made in view of the above circumstances, and it is an object of the present invention to provide an optical disc device including a lens-position detecting section for detecting a lens position signal (LPOS signal), the LPOS signal indicating a position of an object lens with respect to a carriage, wherein an eccentric component contained in the LPOS signal is removed by a learning processing to eliminate unnecessary driving of a stepping motor, thereby stabilizing tracking control and reducing power consumption.

The present invention provides an optical disc device comprising: a carriage opposed to an optical disc medium and capable of moving in a radial direction of the optical disc medium; a first driving section for driving the carriage; an object lens mounted in the carriage for focusing laser light on the optical disc medium; a second driving section mounted in the carriage for displacing the object lens in the radial direction of the object lens; a lens-position detecting section fixed to the carriage for detecting positional information on the object lens; an eccentricity removing section for generating a position detecting signal by removing an eccentric component of the optical disc medium from the positional information on the object lens; and a displacement detecting section for determining, using the position detecting signal, whether or not the carriage should be driven and for providing an instruction to begin driving the carriage, to the first driving section, based on a result of the determination.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 11(a) to 11(c) are graphs showing the relationship between the respective control signals for position control and a position of the carriage according to the optical disc device of the present invention;

FIGS. 12(a) to 12(c) are graphs obtained by enlarging parts of FIGS. 11(a) to 11(c).

DESCRIPTION OF THE PREFERRED EMBODIMENTS

Figure 1:
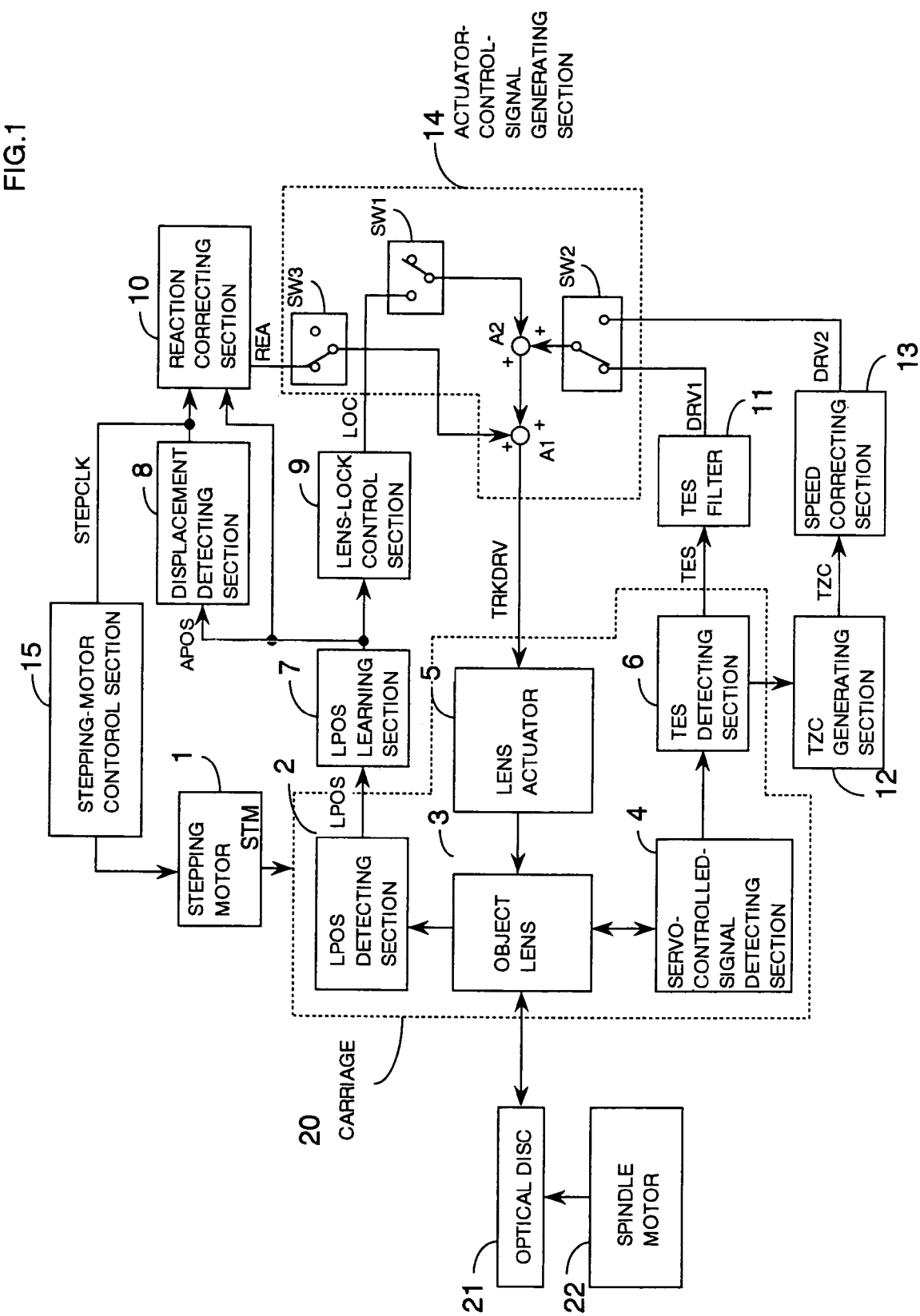
FIG. 1 is a diagram showing a constitutive block for position control of an object lens according to an optical disc device of the present invention.

The present invention provides an optical disc device comprising: a carriage opposed to an optical disc medium and capable of moving in a radial direction of the optical disc medium; a first driving section for driving the carriage; an object lens mounted in the carriage for focusing laser light on the optical disc medium; a second driving section mounted in the carriage for displacing the object lens in the radial direction of the object lens; a lens-position detecting section fixed to the carriage for detecting positional information on the object lens; an eccentricity removing section for generating a position detecting signal by removing an eccentric component of the optical disc medium from the positional information on the object lens; and a displacement detecting section for determining, using the position detecting signal, whether or not the carriage should be driven and for providing an instruction to begin driving the carriage, to the first driving section, based on a result of the determination.

In terms of reduction in power and profile of the optical disc device, the first driving section is constituted of a stepping motor which moves the carriage at predetermined intervals.

The second driving section may be constituted of an actuator (hereafter, referred to as a lens actuator) which is capable of slightly displacing the object lens with an initial position (hereafter, referred to as a neutral position) thereof taken as the center.

The lens-position detecting section may comprise a photosensor which is capable of detecting a minute change in the object lens. The photosensor includes a combination of a light emitting device and a light receiving device.

Light emitted from the light emitting device strikes an element supporting the object lens and is reflected thereon to be received by the light receiving device. The received light is converted into an electric signal responsive to an amount of the light. A magnitude of the electric signal is responsive to positional information on the object lens. The signal indicating the positional information on the object lens is called a lens position signal (LPOS signal). The lens-position detecting section is equivalent to a LPOS detecting section mentioned later.

The eccentricity removing section calculates an eccentric component of the optical disc medium which is contained in the LPOS signal indicating the positional information on the object lens and removes the eccentric component from the LPOS signal to generate a position detecting signal. The position detecting signal is called an APOS signal.

The eccentric component refers to information on a periodic change in the object lens that moves to follow the deviation of a position of the track on the optical disc medium in the case where the eccentricity is present in the optical disc medium. Typically, the eccentric component can be detected as a period signal having a sinusoidal waveform.

In order to determine the periodic signal responsive to the eccentric component by calculation, the present invention utilizes a conventional learning processing. That is, according to the present invention, the LPOS signal which has been detected by the lens detecting section is learned, and the eccentric component as the periodic signal contained in the LPOS signal is determined by calculation. The periodic signal (eccentric component) obtained by the learning of the LPOS signal is hereafter referred to as a LEA signal.

The position detecting signal (APOS signal) is obtained by subtracting the LEA signal from the LPOS signal using a calculation unit. In the case where, as described above, the APOS signal can be determined by utilizing the learning processing, the eccentricity removing section is equivalent to a LPOS learning section mentioned later and includes a learning processing section for determining information on the eccentric component by calculation and an operating section. The operating section may be constituted of any of various logic elements such as a subtracter and the like.

The displacement detecting section receives the APOS signal, compares a level of the APOS signal and a predetermined threshold level (slice) and determines that the carriage should be driven if the level of the APOS signal exceeds the predetermined threshold level. If the displacement detecting section determines that the carriage should be driven, the pulse signal having a predetermined pulse width (referred to as a signal STEPCLK) is output to a stepping-motor control section to drive the first driving section (stepping motor).

The optical disc device according to the present invention may further comprise a reaction correcting section for generating, using both the instruction to begin driving the carriage from the displacement detecting section and the position detecting signal from the eccentricity removing section, a reaction correcting signal which corrects a reaction caused by the displacement of the object lens, and for providing the reaction correcting signal to the second driving section during a period between a beginning and a finish of the movement of the carriage.

The reaction correcting signal is equivalent to a REA signal mentioned later. The lens actuator as the second driving section is driven in accordance with a change in a tracking error signal (TES signal) obtained using, typically, light reflected from the optical disc medium.

Given the drive signal provided to the lens actuator is a TRKDRV signal, the TRKDRV signal is expressed as a signal obtained by adding the reaction correcting signal (REA signal) to a signal indicating the change in the TES signal (referred to as a DRV1 signal).

Also, the optical disc device according to the present invention may further comprise a lens-lock control section for generating, using the position detecting signal, a lock signal to lock the object lens in its initial position with respect to the carriage during seek operation and for providing the lock signal to the second driving section.

The lock signal is equivalent to a LOC signal mentioned later.

The LOC signal is added to the TRKDRV signal provided to the lens actuator.

According to the present invention, the position detecting signal (APOS) obtained by removing the eccentric component from the lens position signal (LPOS) is used to drive the lens actuator, so that unnecessary movements of the carriage can be eliminated irrespective of the amount of the eccentricity which the optical disc medium has, thereby stabilizing the tracking servo and reducing consumption power.

The present invention will now be explained in detail based on an embodiment shown in the drawings. It should be understood that the present invention is not limited to the embodiment.

<Construction of an Optical Disc Device of the Present Invention>

FIG. 1 is a schematic diagram showing a construction of an optical disc device according to an embodiment of the present invention.

In this figure, of the elements of the optical disc device, optical elements for applying light to an optical disc to detect the light reflected from the optical disc and a control block for performing seek control of the optical elements with respect to the optical disc are illustrated.

An optical disc 21 is mounted on a fixed platform, not illustrated, and rotated by a spindle motor 22.

The spindle motor 22 is connected to a motor control section, not illustrate, which controls a rotational speed of the spindle motor 22. The motor control section is constructed of, for example, a so-called microcomputer such as a CPU.

The spindle motor 22 is constructed of, for example, a brushless DC motor, and rotates the optical disc at a predetermined constant speed.

The optical disc 21 of the present invention is a disc such as a magneto-optical disc or a data-exchangeable optical disc to which an optical beam is applied so that data can be written and read on the optical disc (a CD, a DVD or the like).

The optical elements are mounted in a carriage 20. Mainly mounted in the carriage 20 are an LPOS detecting section 2, an object lens 3, a servo-controlled-signal detecting section 4, a lens actuator 5, and a TES detecting section 6.

The control block is constituted mainly of a stepping motor (STM) 1, an LPOS learning section 7, a displacement detecting section 8, a lens-lock control section 9, a reaction correcting section 10, a TES filter 11, a TZC generating section 12, a speed correcting section 13, an actuator-control-signal generating section 14, and a stepping-motor control section 15. The control block is constituted mainly of a microcomputer including a CPU, a ROM, a RAM and the like. The functions of the elements of the control block are realized by the CPU operating according to programs stored in the ROM and the like.

The stepping motor (STM) 1 is operative to rotate a transmission member, not illustrate, by a predetermined angle upon receipt of a pulse signal (STEPCLK) so that the carriage 20 is moved linearly in a radial direction of the optical disc 21. The stepping-motor control section 15 is operative to drive the stepping motor 1 upon receipt of a pulse signal (STEPCLK).

Assuming that a stepping angle of rotation of the stepping motor 1 is an angle of D° and a distance covered by the carriage 20 during one turn of the stepping motor 1 is P (mm), a moving speed Vp (mm/pulse) of the carriage per pulse is expressed by Vp=P×D/360.

Assuming that a target speed of rotation of the stepping motor 1 is N (pulse/second), a moving speed V (mm/second) of the carriage 20 is expressed by V=Vp×N. Accordingly, if the target speed N of rotation of the stepping motor 1 is set by a CPU (not illustrated), the moving speed V of the carriage 20 is determined by calculation of the above formula (V=Vp×N).

The servo-controlled-signal detecting section 4 is constituted of an optical element for guiding laser light emitted from a laser diode to the object lens 3 in order to apply the light to the optical disc 21, and of an optical element for forming such an optical path that allows the light reflected from the optical disc 21 to be detected by a photodetector.

The object lens 3 is used to focus laser light into a light spot having a predetermined diameter (for example of about 1.6 μm) on a surface of the optical disc. The object lens 3 is supported by a spring and mounted in the carriage 20.

The lens actuator 5 is constituted of a pair of magnets respectively disposed at both sides of a housing of the object lens 3 and a pair of electromagnets respectively opposed to the pair of magnets.

By controlling an amount of current applied between the electromagnets, an attractive force is exerted between the magnets opposed to the electromagnets to displace the object lens 3 by a predetermined angle in the radial direction of the optical disc 21. The amount of current applied between the electromagnets is determined by a position control signal TRKDRV provided to the lens actuator.

Figure 2:
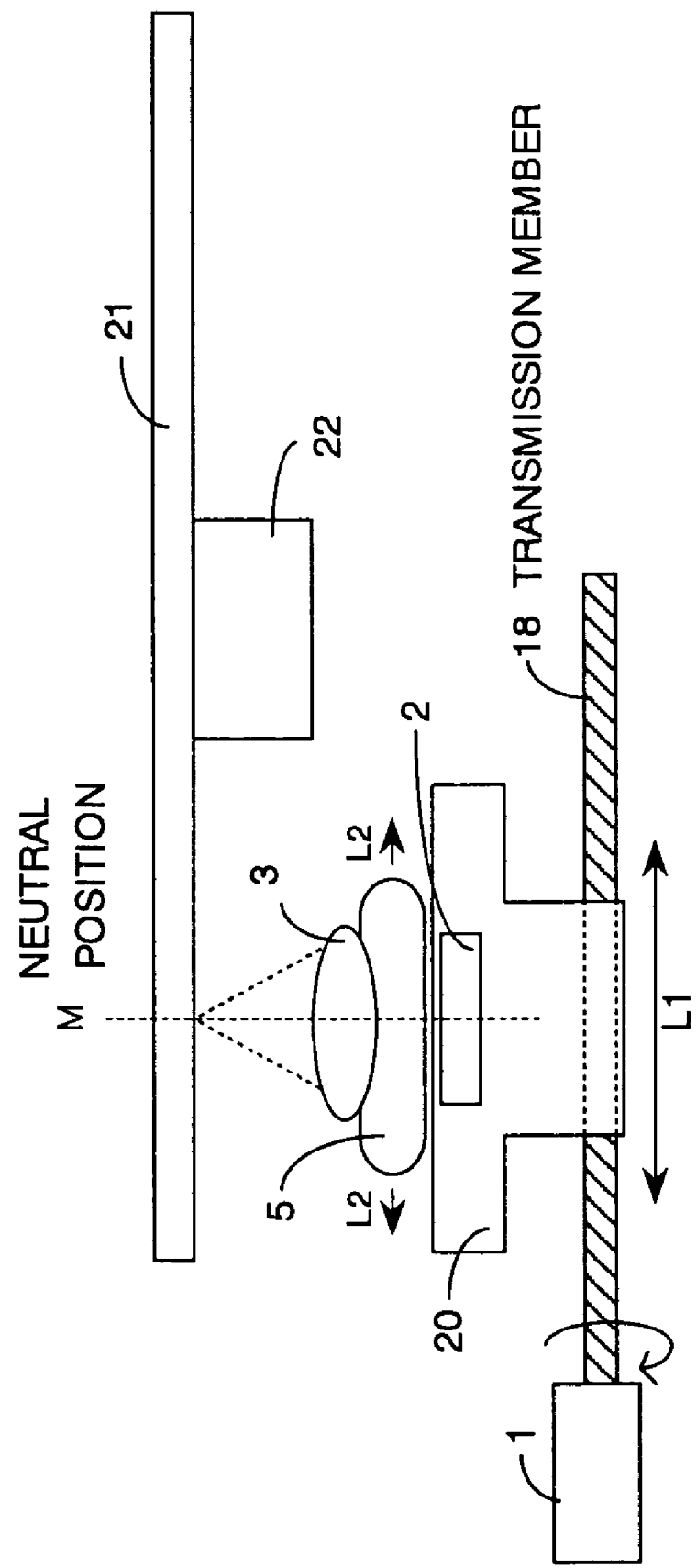
FIG. 2 is a diagram showing a construction of elements for position control of the object lens according to the optical disc device of the present invention.

FIG. 2 is a diagram showing a construction of elements for position control of the carriage and the object lens according to the optical disc device of the present invention. Illustrated here are only elements relevant to explanation.

In FIG. 2, an elongated transmission member 18 in a bar form is connected to the stepping motor 1. The transmission member 18 is also caused to rotate by the rotation of the stepping motor 1.

The transmission member 18 has a screw-threaded surface, whereas part of the carriage 20 has a threaded screw hole in which the transmission member 18 is threaded.

Upon the rotation of the stepping motor 1, the carriage 20 is linearly moved in a direction L1 (radial direction of the disc 21) to cover a distance responsive to the amount of rotation of the transmission member 18.

The object lens 3 and the lens actuator 5 are mounted on the carriage 20, and are moved by the same distance as covered by the carriage 20. For example, assuming that a unit distance of movement is L1 (for example, 50 μm), the object lens 3 and the lens actuator 5 are moved by a distance of an integral multiple of the unit distance L1.

The object lens 3 is not fixed to the carriage 20 but it is supported by the spring anchored to the carriage 20 as mentioned above, and the object lens 3 is slightly moved by the lens actuator 5 in a direction L2 of FIG. 2 (radial direction of the disc 21).

The LPOS detecting section 2 is fixed to the carriage 20 and determines the position of the object lens 3 by measurement. A neutral position M shown in FIG. 2 is a position of the object lens 3 when the object lens 3 is not displaced at all. The object lens is slightly moved in the direction L2 to the right or left with the neutral position M taken as the center (broken line). Assuming that a maximum amount of displacement (slice) is Lmax, $-Lmax \leq L2 \leq Lmax$.

The TES detecting section 6 is a section for detecting, from the light received by the servo-controlled-signal detecting section 4, a tracking error signal (TES) and taking out the signal as an electric signal. The TES detecting section 6 is constituted of a sensitivity adjusting amplifier and the like.

The LPOS detecting section 2 is operative to measure the amount of displacement of the object lens 3 and is constituted of a photosensor fixed to the carriage 20 in the vicinity of the object lens 3. The photosensor includes a light emitting device such as a LED, and a light receiving device (photoreceiver). The light emitting device and the photoreceiver are arranged so that light from the LED strikes the object lens 3 and is reflected thereon to be received by the photoreceptor. By determining an intensity of the light received by the photoreceptor, it is possible to determine the amount of displacement of the object lens from the neutral position M when the object lens is not displaced at all by the lens actuator.

From the LPOS detecting section 2, a lens position signal (hereafter, referred to as an LPOS signal) is output which is responsive to the amount of displacement of the object lens from the neutral position M.

The LPOS learning section 7 is a section for receiving the LPOS signal output from the LPOS detecting section 2 and learning the LPOS signal through a specific learning processing to detect an eccentric component contained in the LPOS signal and to remove the eccentric component from the LPOS signal.

The learning processing is performed by a feedback control of the received LPOS signal. Examples of the learning processing include a learning control processing mentioned in Japanese Unexamined Patent Publication No. 2000-339729.

Figure 3:
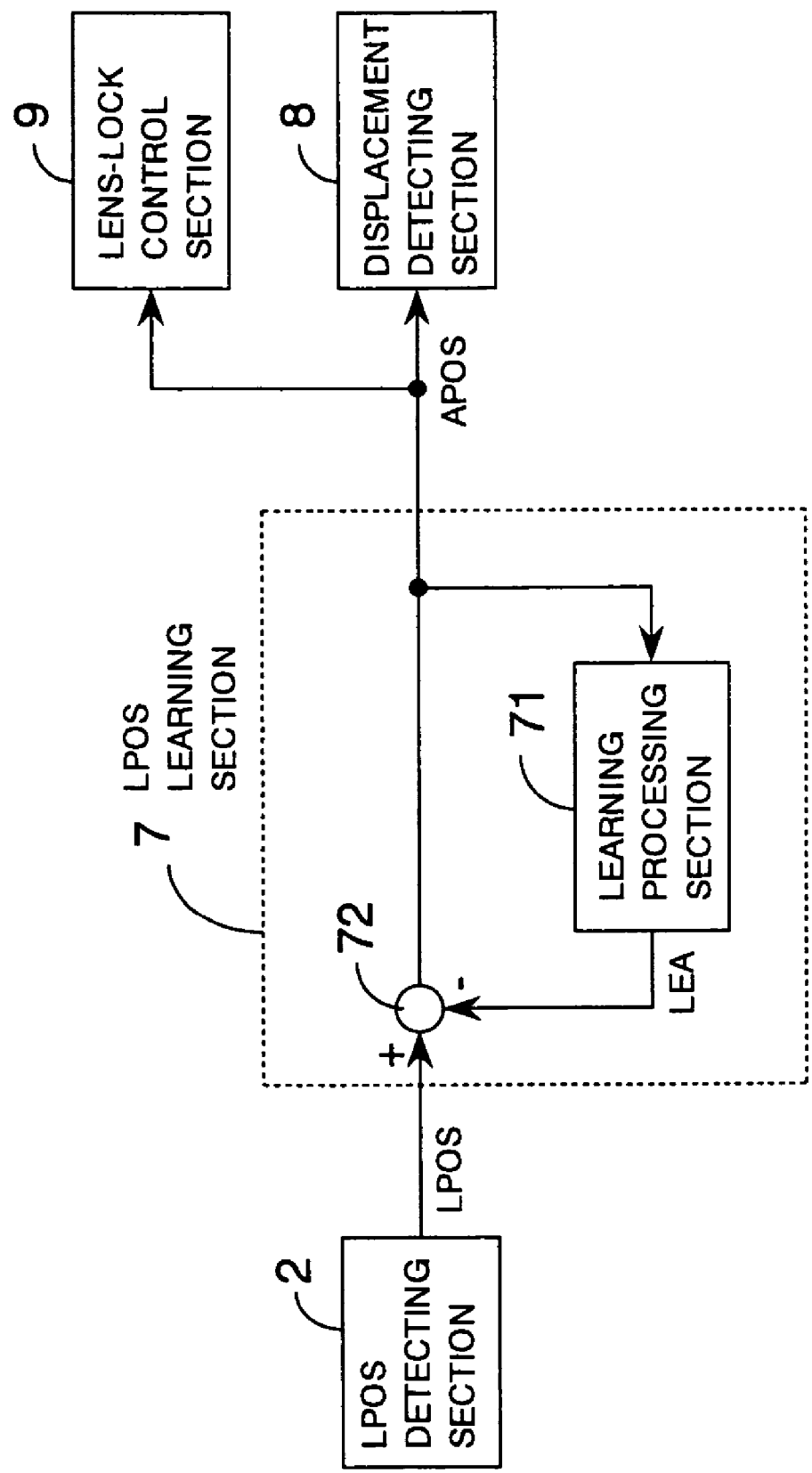
FIG. 3 is a diagram showing a constitutive block of an example of a LPOS learning section according to the optical disc device of the present invention.

FIG. 3 is a diagram showing a schematic construction of an example of the LPOS learning section according to the present invention.

Referring to FIG. 3, the LPOS learning section 7 is constituted of a learning processing section 71 for performing the learning processing and a subtracter 72.

At the subtracter 72, a LEA signal generated by the learning processing section 71 and indicating a result of learning the LPOS signal is subtracted from the LPOS signal output from the LPOS detecting section 2 so as to synthesize and generate an APOS (APOS=LPOS−LEA) signal.

The obtained APOS signal after learning is a signal which indicates a position information component when the eccentricity is present in the optical disc.

Figure 4:
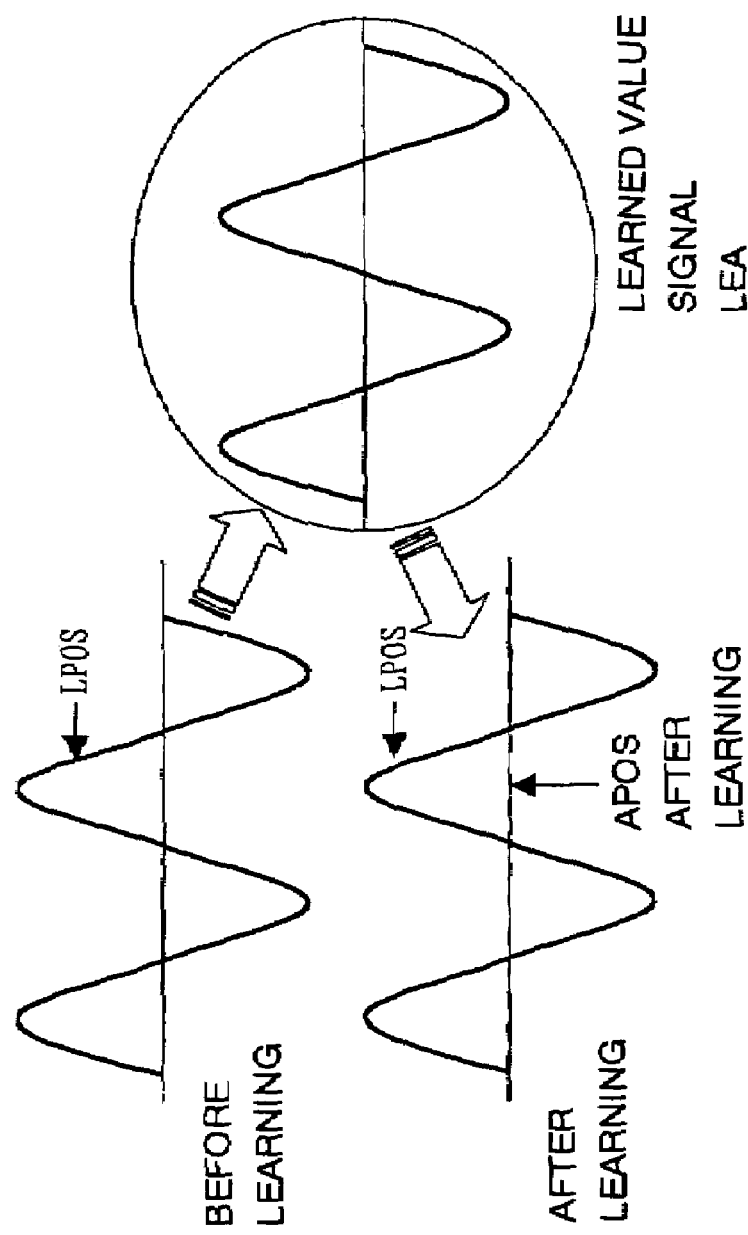
FIG. 4 is a diagram showing the LPOS learning section according to the optical disc device of the present invention.

FIG. 4 is a diagram showing an example of the LPOS signal before learning output from the LPOS detecting section; the LEA signal generated by the learning processing section 71 and indicating the result of learning the LPOS signal; and the APOS signal after learning indicating the eccentric component.

In FIG. 4, the LPOS signal before learning is depicted as a sinusoidal signal but, actually, it contains the eccentric component since the eccentricity is present in the optical disc.

By learning the LPOS signal which contains the eccentric component, it is possible to generate the LEA signal responsive to the eccentric component (learned value signal). In FIG. 4, although the LPOS signal and the LEA signal are depicted as substantially the same wave signal, the LPOS signal before learning contains a tracking information component to be determined by calculation in addition to the eccentric component.

The APOS signal output from the LPOS learning section 7 is a signal obtained by subtracting the LEA signal responsive to the eccentric component from the LPOS signal which contains the eccentric component. In FIG. 4, the APOS signal is shown by dashed lines. The APOS signal is output as a signal containing a vibration component in a slight amount substantially close to zero.

The APOS signal thus generated is provided to the displacement detecting section 8 where the APOS signal is then used for generating the pulse signal STEPCLK. The displacement detecting section 8 determines whether the stepping motor 1 should be driven or not based on the APOS signal and, in the case where the stepping motor 1 should be driven, generates the pulse signal STEPCLK responsive to the distance L1 by which the carriage 20 is to be moved.

The lens-lock control section 9 is a section for controlling (locking) the lens actuator to cause the lens actuator not to move during the seek operation of the carriage. The lens-lock control section 9 is constituted of circuits used for phase compensation, sensitivity adjustment and the like. The APOS signal after learning is input to the lens-lock control section 9, and then the lens-lock control section 9 performs a phase compensating processing using the APOS signal and outputs an LOC signal for locking the lens actuator.

The reaction correcting section 10 is a section which generates a reaction correcting signal (REA) for eliminating the influence of reaction exerted against the lens actuator. The reaction correcting section 10 is constituted mainly of circuits used for phase compensation and sensitivity adjustment.

The lens actuator is given a reaction force by the spring supporting the object lens when the stepping motor is driven based on the pulse signal STEPCLK. If the reaction force is great, a disturbance (control residual component) is created on the TES signal, decreasing the stability in tracking servo.

In order to stabilize the tracking servo, the reaction correcting section 10 generates the reaction correcting signal (REA) and corrects the TRKDRV signal to be provided to the lens actuator 5.

The pulse signal STEPCLK and the APOS signal after learning are input to the reaction correcting section 10 where, during a specific period from the input of the pulse signal STEPCLK (for example, 5 msec), i.e., during a period between a beginning of driving of the stepping motor and a time at which the movement of the carriage is considered to be finished, current responsive to the APOS signal is generated and output as a feedforward signal (REA). The REA signal is added to the signal TRKDRV that controls the lens actuator 5. Thus, the influence of reaction against the lens actuator is eliminated.

The TZC generating section 12 is a section for generating a zero-cross signal (hereafter, referred to as a TZC signal) based on the TES signal which varies sinusoidally.

The TZC signal is utilized for calculating a moving speed VA of the light spot in the radial direction of the optical disc.

Assuming that a width of an interval between the adjacent tracks on the optical disc is XA (mm), that the number of tracks which the light spot crosses per second is K, and that a time required for the light spot to cross the interval between the adjacent tracks is TA (s), VA=K×XA (mm/s) and K=1/TA. Thus, the moving speed VA is calculated from VA=XA/TA. The time TA is determined from the TZC signal. The width XA has a predetermined value. The moving speed VA of the light spot is substantially the same as the moving speed of the object lens.

In the case where the TZC signal itself is utilized, the moving speed VA of the light spot cannot be correctly calculated when the TES signal fails to have a sinusoidal waveform. Accordingly, the moving speed VA of the light spot determined from the TZC signal is corrected using a target value Vo (mm/s) of the moving speed of the carriage 20. The target value Vo is a value previously obtained. The speed correcting section 13 is operative to correct the moving speed VA using the given TZC signal and thereby to generate a signal DRV2 for driving the lens actuator 5.

The TES filter 11 is a filter for generating, using the TES signal output from the TES detecting section 6, a drive signal DRV1 which is to be applied to the lens actuator 5. The TES filter 11 is constituted of a sensitivity adjusting amplifier, a phase compensator and the like.

The actuator-control-signal generating section 14, which is constituted of a group of switches (SW1, SW2, SW3) and adders (A1, A2), is operative to generate the drive signal TRKDRV for actually controlling the lens actuator 5, with use of the combination of the drive signals (DRV1, DRV2), the lock signal LOC and the reaction correcting signal REA.

The switch SW3 assumes the ON state when the tracking servo is performed and the ON state when the switch SW1 is in the OFF state.

The switch SW2 is operative to switch between the drive signal DRV1 output from the TES filter 11 and the drive signal DRV2 output from the speed correcting section 13. For example, the switch SW2 assumes the OFF state during tracking servo to select the drive signal DRV1 as shown in FIG. 1 and assumes the ON state during seek operation to select the drive signal DRV2 output from the speed correcting section 13.

The switch SW1, which is operative to control the addition of the lock signal LOC output from the lens-lock control section 9, assumes the OFF state when the lock signal LOC is not added as shown in FIG. 1 and assumes the ON state when the lock signal LOC is added to the adder A2 to lock the object lens during seek operation.

This means that, during seek operation, the adder A2 is operative to add together the drive signal DRV 2 and the lock signal LOC.

The adder A1 is operative to add together the output from the A2 and the correcting signal REA output from the reaction correcting circuit 10. For example, during tracking servo, the adder A1 is operative to add together the drive signal DRV1 output from the TES filter 11 and the correcting signal REA and to give the resulting as the TRKDRV signal to the lens actuator 5.

Elements for position control of the object lens and the carriage of the optical disc of the present invention are as mentioned above. Of the elements of the control block, the TES detecting section 6, the TES filter 11, the TZC generating section 12, the speed correcting section 13 and the lens-lock control section 9 may be constituted of conventional circuits.

According to the present invention, of the elements of the control block, the LPOS learning section 7, the displacement detecting section 8 and the reaction correcting section 10 are characteristic sections for position control.

<Position Control According to the Present Invention>

A position control of the lens actuator and the carriage of the optical disc according to the present invention is described in comparison with a position control without the LPOS signal being learned.

[Position Control Without the LPOS Signal Being Learned]

First, there are described operations for the position control where tracking control is performed without the LPOS signal being learned.

FIGS. 11(a) to 11(c) are graphs showing the relationship between the respective control signals and a position of the carriage during tracking control without the LPOS signal being learned. FIGS. 12(a) to 12(c) are graphs obtained by enlarging parts of FIGS. 11(a) to 11(c).

In FIGS. 11(a) to 11(c) and 12(a) to 12(c), the horizontal axis indicates the time (second). In FIGS. 12(a) to 12(c), the horizontal axis indicates the time of about 0.21 (second) to about 0.27 (second) shown in FIGS. 11(a) to 11(c).

In FIGS. 11(a) and 12(a), the vertical axis indicates the amount of displacement L2 (μm) of the object lens. With the reference position (neutral position M) taken as zero, a displacement of the object lens in an outer periphery direction of the optical disc is regarded as a plus displacement, whereas a displacement in an inner periphery direction is regarded as a minus displacement. In the graphs, the amount of displacement L2 is responsive to the LPOS signal.

FIGS. 11(b) and 12(b) indicate the presence or absence of the pulse signal STEPCLK to be provided to the stepping motor. Regarding numerical values in the vertical axis, the value "0" indicates a state where the pulse is not generated and the value "1" indicates a state where the pulse is generated.

In other words, the pulse signal STEPCLK is a trigger signal to begin driving the stepping motor 1. For a specific time (for example, about 5 msec) from the generation of this pulse, the stepping motor 1 is driven to move the carriage 20 by a predetermined distance.

In FIGS. 11(c) and 12(c), the vertical axis indicates the distance (μm) by which the carriage 20 is moved by the rotation of the stepping motor 1. In the present embodiment, the stepping motor 1 comprises a two-phase excitation motor with a step angle of 18°, and the transmission member 18 has thread parts provided at 1 mm-pitches.

If the motor is driven at a two-phase excitation operation mode, the stepping motor 1 is rotated by an angle of 18° for every change in excitation pattern. Thus, when a single pulse signal is provided, the carriage 20 is moved by a distance of 1(mm)×(18 (degree)/360 (degree))=50(μm). This means that the minimum distance of movement of the carriage 20 is 50 μm and that the rough seek control is performed with 50 μm taken as a unit.

In the present embodiment, the predetermined slice is 30 μm. In the case where the object lens 3 is displaced by a distance exceeding 30 μm from the neutral position M, i.e., in the case where the LPOS signal responsive to the distance of 30 μm is detected, only one pulse signal STEPCLK is output to drive the stepping motor 1 and thereby to move the carriage by 50 μm.

Referring to FIG. 12(a), when the LPOS signal detects that the displace amount L2 has exceeded 30 μm, a pulse signal STEPCLK (P1) is generated at the time of, for example, about 0.225 (second) as shown in FIG. 12(b), and then the carriage is moved by 50 μm for about 5 msec until the time of 0.23 (second) as shown in FIG. 12(c).

For example, if the object lens 3 has been displaced by 30 μm from the neutral position M in the outer periphery direction, the carriage 20 is moved by 50 μm in the outer periphery direction by the driving of the stepping motor 1.

Even during the movement of the carriage, however, the object lens 3 is moved by the actuator 5 to follow the track on the optical disc so that the object lens 3 always comes directly under the track. Thus, given that the eccentricity was absent in the optical disc 21, the object lens 3 would be displaced by 20 μm from the neutral position M in the inner periphery direction when the carriage finishes moving by 50 μm in the outer periphery direction.

In the case where the eccentricity is present, however, the situations are different, and complicated operations are performed as shown in FIGS. 11 and 12.

Shown in FIGS. 11(a) to 11(c) and 12(a) to 12(c) is an optical disc having a spiral track. In this disc, an amount of the eccentricity of the disc is 20 μm and an interval between the adjacent tracks is 0.9 μm. In the case where the eccentricity is present as above, a second pulse signal (P2) is generated, and thereby the carriage 20 is moved in a direction reverse to the direction of its movement made at the generation of the pulse signal (P1). This is because during the movement of the carriage 20 by the pulse signal (P1), the optical disc is rotated to generate the amount of displacement L2 of the object lens 3 by addition of the amount of the eccentricity (20 μm) (see FIG. 12(a)).

That is, because of the amount of the eccentricity, the object lens 3 is displaced by the amount of displacement L2 of 30 μm or more (about −50 μm) in the reverse direction at the time of about 0.23 in FIG. 12(a), and the pulse signal (P2) is generated by the LPOS signal responsive to the displacement amount L2. This causes the stepping motor 1 to be driven in the reverse direction so that the carriage 20 is moved to the initial zero position as shown in FIG. 12(c). Even after this, the two pulse signals (P1, P2) are periodically generated in accordance with the rotation of the optical disc 21 (see FIGS. 11(b) and 12(b)).

Referring to FIGS. 11(a) to 11(c) and 12(a) to 12(c), if the optical disc 21 has a large amount of the eccentricity, the stepping motor 1 is necessarily driven twice during one turn of the optical disc (one turn is responsive to one period of the LPOS signal) to reciprocate the carriage 20. Such reciprocating motion of the carriage, however, does not occur if the amount of the eccentricity is sufficiently smaller than the distance by which the carriage 20 is moved or if the period between the beginning of driving of the stepping motor and the time at which the movement of the carriage is considered to be finished is shorter than the period required for one turn of the optical disc.

Meanwhile, in the case where the eccentricity is present in the optical disc, the LPOS signal shown in FIG. 11(a) contains the eccentric component as well. If the eccentric component can be detected and removed from the LPOS signal directly after the optical disc is mounted in the device, the reciprocating motion shown in FIGS. 11(a) to 11(c) can be avoided.

[Position Control with the LPOS Signal Being Learned]

Next, there is described the position control performed by the optical disc device of the present invention.

The switches (SW1, SW2, SW3) in the actuator-control-signal generating section 14 are turned on/off, as shown in FIG. 1, for the tracking servo. It is assumed that the state shown in FIG. 1 is the OFF state. That is, the switch SW1 is opened so that the output (LOC signal) from the lens-lock control section 9 is not input to the lens actuator 5, whereas the switch SW3 is connected to allow reaction correction to be valid.

The switch SW2 is connected to the TES filter 11 so that the drive signal DRV1 generated from the TES signal is provided to the lens actuator 5 via the adders A1 and A2.

Figure 5:
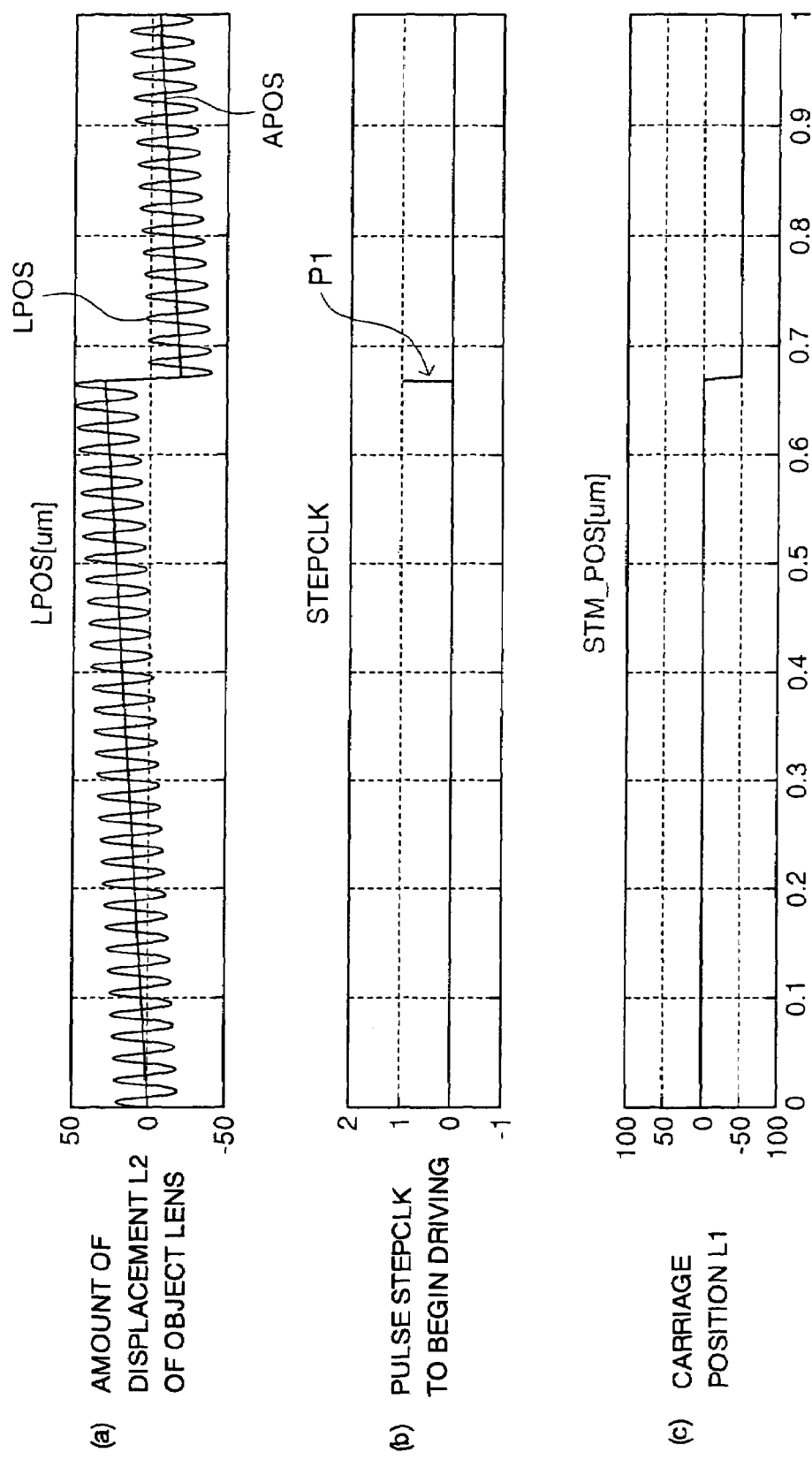
FIGS. 5(a) to 5(c) are graphs showing the relationship between respective control signals for position control and a position of the carriage according to the optical disc device of the present invention.

FIGS. 5(a) to 5(c) are graphs showing the relationship between the control signals and a position of the carriage during tracking control with the LPOS signal being learned according to the optical disc device of the present invention.

Figure 6:
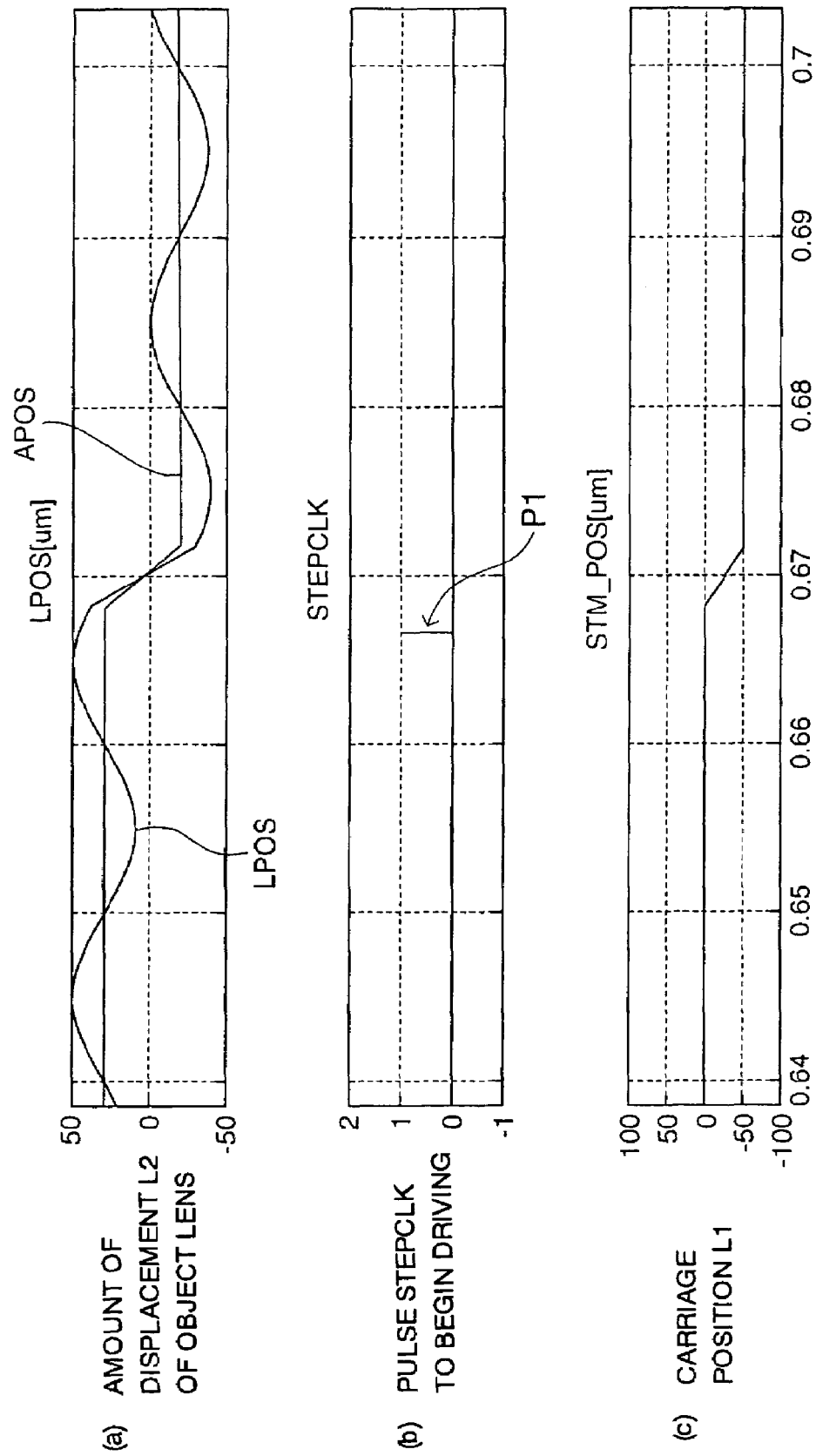
FIGS. 6(a) to 6(c) are graphs obtained by enlarging parts of FIGS. 5(a) to 5(c)

FIGS. 6(a) to 6(c) are graphs obtained by enlarging parts of FIGS. 5(a) to 5(c) (parts at the time of about 0.64 to about 0.70 seconds). As is the case with FIGS. 11(a) to 11(c) and 12(a) to 12(c), the optical disc 21 has a spiral track and an eccentricity amount of 20 µm.

FIGS. 5(a) and 6(a) show the displacement amount L2 (µm) of the optical lens. FIGS. 5(b) and 6(b) show the pulse signal STEPCLK. FIGS. 5(c) and 6(c) show the position of the carriage 20.

Referring to FIGS. 5(a) and 6(a), a signal which varies sinusoidally is the LPOS signal output from the LPOS detecting section 2, and a signal which varies linearly is the signal after learning (APOS signal) output from the LPOS learning section 7.

The LPOS signal is subjected by the LPOS learning section 7 to the processing shown in FIG. 4, and as a result, the APOS signal which is the linear signal shown in FIGS. 5(a) and 6(a) is generated. That is, even though the eccentricity is present in the optical disc, the APOS signal without the eccentric component is generated as the linear signal by the learning processing.

The LPOS signal, which varies sinusoidally, periodically exceeds the slice level of 30 µm. Referring to FIG. 6(a), on the other hand, the APOS signal, which varies smoothly following the spiral track, exceeds 30 µm directly before the time of 0.67 seconds for the first time.

At a timing when the fact that the APOS signal input to the displacement detecting section 8 has exceeded 30 µm is detected (at the time of 0.667 seconds), only one pulse signal STEPCLK (P1) is output from the displacement detecting section 8 (FIG. 5(b) and FIG. 6(b)).

After the pulse signal STEPCLK (P1) is output, the stepping motor 1 is driven to move the carriage 20 by a distance of 50 µm as shown in FIG. 6(c).

Since the movement of the carriage also causes the object lens to be moved by the same distance, the LPOS signal and the APOS signal vary as shown in FIG. 6(a).

Referring to FIG. 6(a), the LPOS signal then varies sinusoidally and at times exceeds the slice level (−30 µm) in the reverse direction. The APOS signal, on the other hand, varies linearly and does not exceed the slice level in the reverse direction due to the effect of learning.

Since the APOS signal, which smoothly varies as described above, is input to the displacement detecting section 8 to determine whether or not to drive the stepping motor, the pulse signal STEPCLK is not generated any more even though the pulse signal P1 is output to drive the motor 1 and thereby to move the carriage 20.

In comparing the position control shown in FIGS. 5(a) to 5(c) and 6(a) to 6(c) with the LPOS signal being learned with the position control shown in FIGS. 11(a) to 11(c) and 12(a) to 12(c) without the LPOS signal being learned, it is understood that, in the former position control where the LPOS signal after learning is used, the frequency of generating the pulse signal is reduced, the reciprocating motion of the carriage 20 does not occur and the number of movements of the carriage 20 is dramatically reduced.

That is, by performing the position control according to the present invention, unnecessary movements of the carriage can be eliminated to stabilize the tracking servo. Further, the reduced number of movements of the carriage results in reduced power consumption.

<Description on a Processing of Locking the Object Lens>

There is described a processing of locking the object lens at the neutral position M during seek operation.

For performing lens locking, the switch SW1 is turned on so that the output (LOC signal) from the lens-lock control section 9 is provided to the adder A2. The switch SW3 is turned off.

For performing the seek control, the switch SW2 is also turned on so that the output (DRV2) from the speed correcting section 13 is provided to the adder A2.

Figure 7:
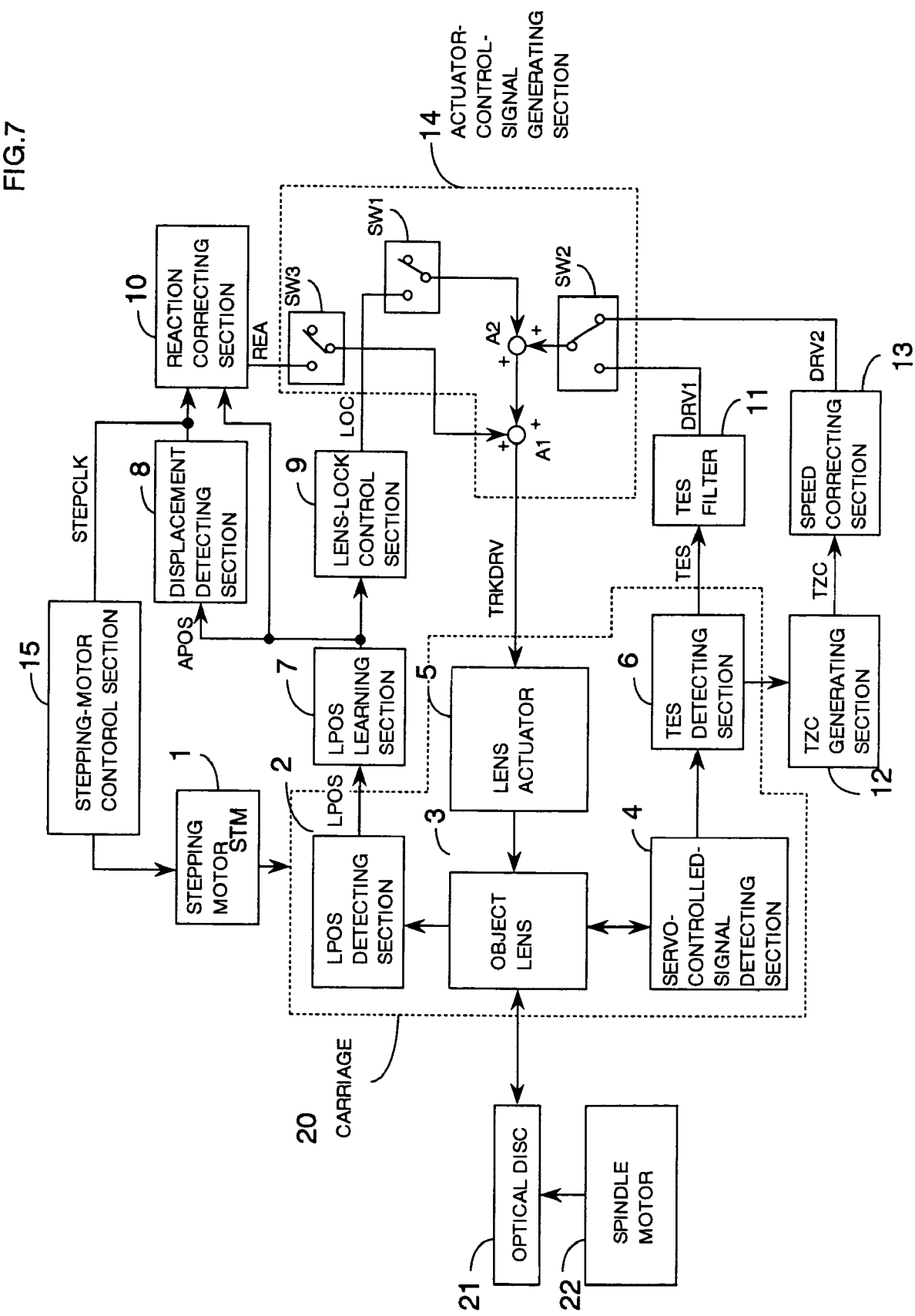
FIG. 7 is a diagram showing a constitutive block for position control of the object lens during seek operation while a lens-locking function is activated according to the optical disc device of the present invention.

FIG. 7 is a diagram showing a construction for lens locking during seek operation wherein the switches SW1 and SW2 are turned on. Turning on/off of the switches may be made by a CPU not illustrated.

In general, the object lens 3 is preferably located at or near the neutral position M to stabilize seek control. This is because an offset or the like of the tracking signal (TES) during the movement of the object lens has an influence in the control of displacement of the object lens 3.

In a seek control where the moving speed of the carriage is the same as that of the object lens 3 that is determined by the speed correcting section based on the zero-cross signal (TZC signal), the lock control is performed only to follow the eccentric component, and as a result, the seek control is performed at a moving speed of the lens given by viewing the lens from the optical disc. Accordingly the object lens cannot be locked at or near the neutral position M. This is because the object lens 3 is locked only using the LOC signal generated from the LPOS signal despite that the LPOS signal contains the eccentric component.

However, if, as in the present invention, the APOS signal after the LPOS signal is learned is used to generate the LOC signal at the lens-lock control section 9, the object lens 3 can be locked substantially at or near the neutral position M during seek control to stabilize seek operation.

Figure 8:
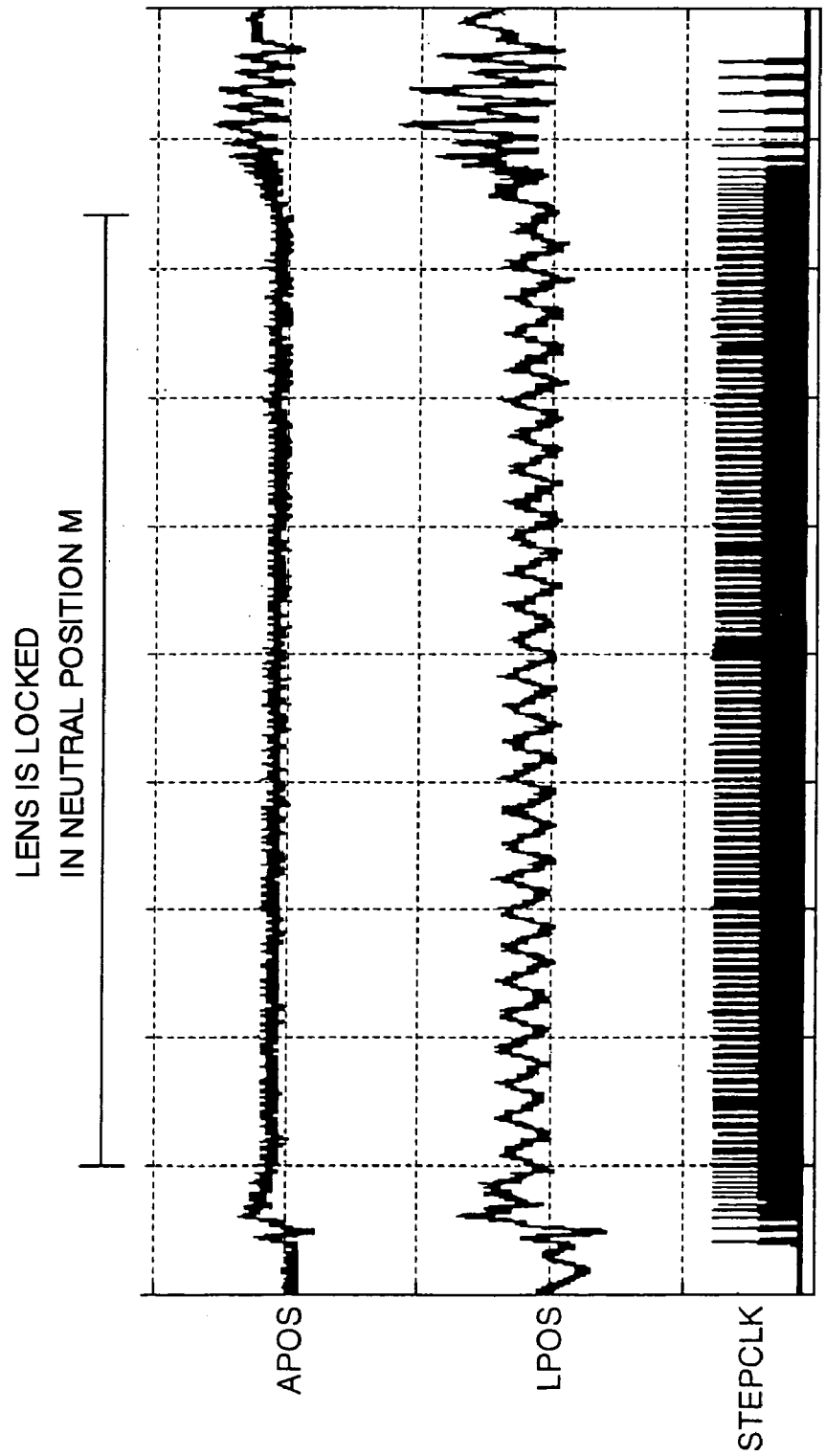
FIG. 8 is a graph illustrating the lens-locking function according to the present invention.

FIG. 8) is a graph illustrating the control signals during seek operation.

FIG. 8 shows the APOS signal after learning. FIG. 8 shows the LPOS signal before learning. FIG. 8 shows the pulse signal STEPCLK.

Referring to FIG. 8, the APOS signal, which is a signal having an amplitude smaller than that of the LPOS signal, allows the object lens 3 to be locked at the neutral position M with high stability during the period shown in the figure.

Release of the lock is made by turning off the switch SW1.

<Description on a Reaction Correcting Processing>

A reaction correcting processing is to relieve the reaction provided to the lens actuator 5 by applying the correcting signal REA to the lens actuator 5 for a predetermined period directly after the generation of the pulse signal STEPCLK. The switch SW3 assumes the ON state.

In general, the lens actuator 5 is given a reaction force by the spring supporting the object lens when the stepping motor is driven by the output of the pulse signal STEPCLK. The state of the reaction force is shown in FIG. 9.

Figure 9:
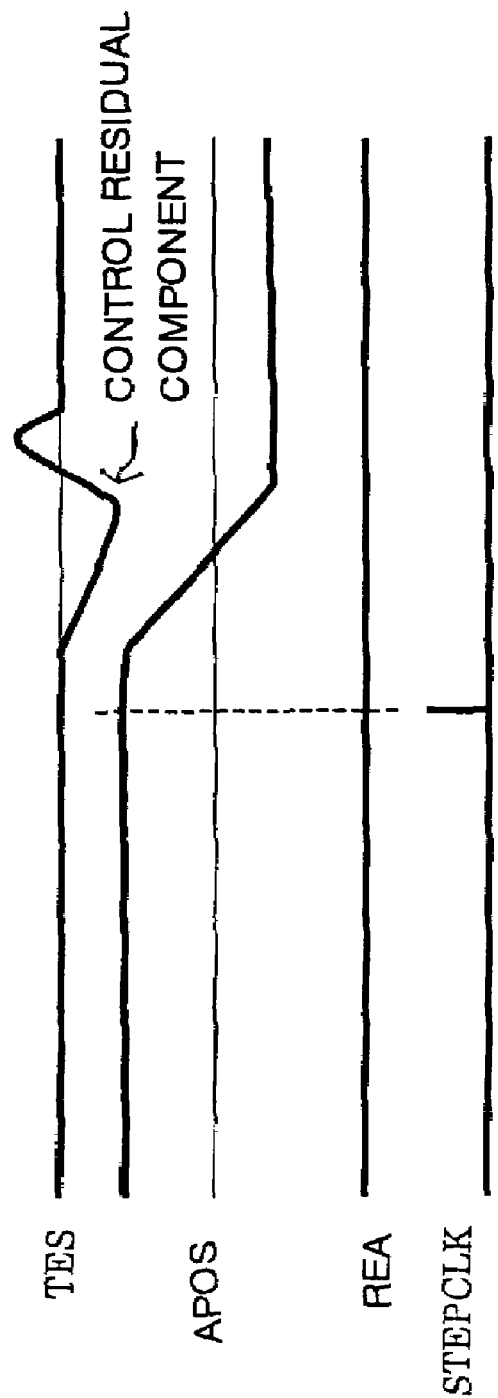
FIG. 9 is a diagram showing control signals when a reaction correcting processing is not performed according to the optical disc device of the present invention.

Referring to FIG. 9, since the carriage 20 moves for a predetermined period after the output of the pulse signal STEPCLK, the APOS signal varies. Further, a disturbance (control residual component) is created on the TES signal detected by the TES detecting section 6 due to the reaction given to the lens actuator 5.

The predetermined period refers to the period (for example, 5 msec) between the beginning of driving of the stepping motor and the time at which the movement of the carriage is considered to be finished.

The control residual component of the TES signal is preferably reduced to as small a value as possible since it possibly constitutes a cause for destabilizing tracking control.

Thus, referring to FIG. 1, the APOS signal after the LPOS signal is learned is used to generate the REA signal as a feedforward signal. The REA signal is then provided to the adder A1, where the REA signal is added to the signal DRV1 used for driving the lens actuator. In other words, the signal DRV1 and the REA signal are provided to generate the signal TRKDRV used for driving the lens actuator.

Figure 10:
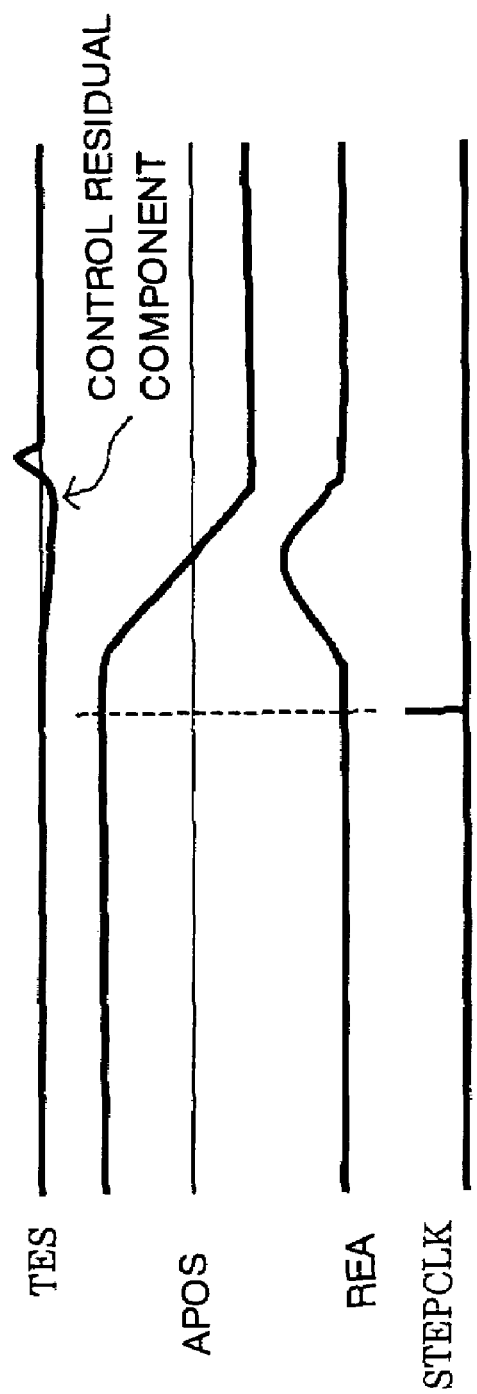
FIG. 10 is a diagram showing the control signals when a reaction correcting processing is performed according to the optical disc device of the present invention.

FIG. 10 is a diagram broadly illustrating a change in a control signal after the control signal is subjected to the reaction correcting processing according to the present invention.

As shown in FIG. 10, the control residual component created on the TES signal is reduced to a great extent due to the output of the REA signal. In other words, since the reaction correcting processing is performed using the APOS signal after learning, the control residual component on the TES signal can be reduced to allow for tracking control with high stability.

What is claimed is:

1. An optical disc device comprising:
    a carriage opposed to an optical disc medium and capable of moving in a radial direction of the optical disc medium;
    a first driving section for driving the carriage;
    an object lens mounted in the carriage for focusing laser light on the optical disc medium;
    a second driving section mounted in the carriage for displacing the object lens in the radial direction of the object lens;
    a lens-position detecting section fixed to the carriage for detecting positional information on the object lens;
    an eccentricity removing section for generating a position detecting signal by removing an eccentric component of the optical disc medium from the positional information on the object lens; and
    a displacement detecting section for determining, using the position detecting signal, whether or not the carriage should be driven and for providing an instruction to begin driving the carriage, to the first driving section, based on a result of the determination.

2. The optical disc device of claim 1, wherein the eccentricity removing section includes (1) a learning processing section for learning the positional information on the object lens and for determining information on the eccentric component contained in the positional information by calculation and (2) an operating section for generating the position detecting signal by removing the determined information on the eccentric component from the positional information.

3. The optical disc device of claim 1, further comprising a reaction correcting section for generating, using the instruction to begin driving the carriage and the position detecting signal, a reaction correcting signal which corrects a reaction caused by the displacement of the object lens and for providing the reaction correcting signal to the second driving section during a period between a beginning and a finish of the movement of the carriage.

4. The optical disc device of claim 1, further comprising a lens-lock control section for generating, using the position detecting signal, a lock signal to lock the object lens in its initial position with respect to the carriage during seek operation and for providing the lock signal to the second driving section.

* * * * *